United States Patent [19]
Brooks

[11] 3,926,529
[45] Dec. 16, 1975

[54] SELECTIVELY REPOSITIONABLE FASTENER
[75] Inventor: Cecil M. Brooks, Dallas, Tex.
[73] Assignee: BLS Associates, Dallas, Tex.
[22] Filed: Aug. 21, 1974
[21] Appl. No.: 499,214

[52] U.S. Cl. .................... 403/4; 52/753 D; 52/754; 16/149; 16/171
[51] Int. Cl.$^2$ ... F16B 1/00; F16D 1/00; F16L 25/00
[58] Field of Search........... 403/4; 52/753 C, 753 D, 52/754, 755, 756, 757, 64; 16/171, 149; 211/182

[56] References Cited
UNITED STATES PATENTS

| | | | |
|---|---|---|---|
| 1,092,926 | 4/1914 | Madsen | 16/149 UX |
| 1,571,601 | 2/1926 | Richards | 52/753 C UX |
| 1,625,612 | 4/1927 | Jensen | 52/753 C UX |
| 1,648,591 | 11/1927 | Repay | 52/754 |
| 2,362,904 | 11/1944 | Kramer | 52/755 |
| 2,565,065 | 2/1951 | Chakeres | 52/753 C UX |
| 2,845,150 | 7/1958 | McBerty | 52/753 D |
| 3,618,991 | 11/1971 | Edwards | 52/753 D |

Primary Examiner—Werner H. Schroeder
Assistant Examiner—Wayne L. Shedd
Attorney, Agent, or Firm—Richards, Harris & Medlock

[57] ABSTRACT

Disclosed is an improved fastener for rigidly connecting a pair of structural members. The device has a pair of fastener members. Each member has a base adapted for attachment to a structural member and bores for interconnecting the members by means of a pin. A plurality of locking surfaces are formed on each of the members for abutting contact with the locking surfaces on the other member to thereby allow rigid locking of the two members together in a plurality of different desired relative orientations.

4 Claims, 7 Drawing Figures

U.S. Patent   Dec. 16, 1975   3,926,529
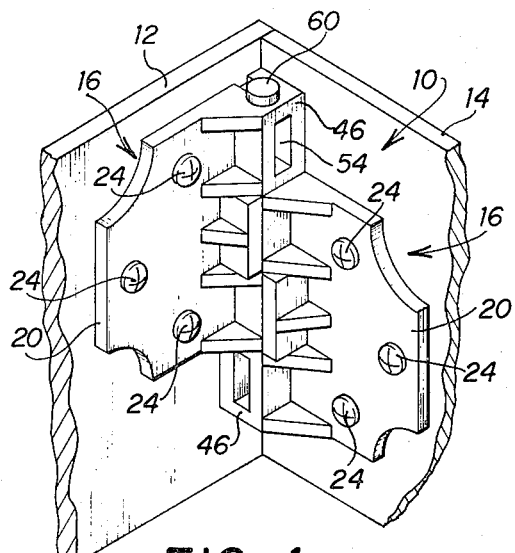
FIG. 1
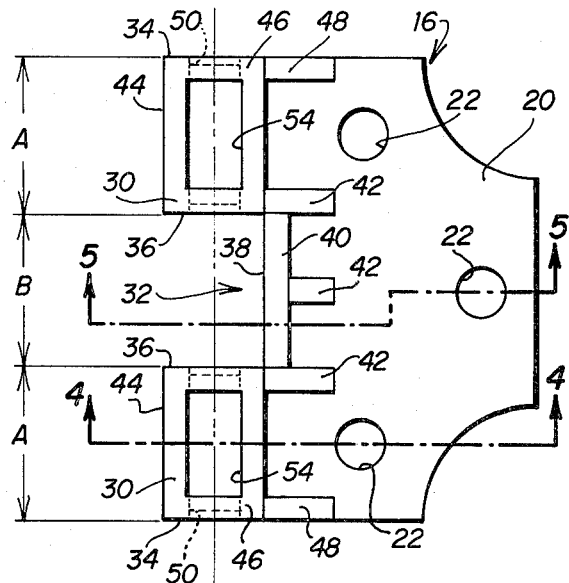
FIG. 3
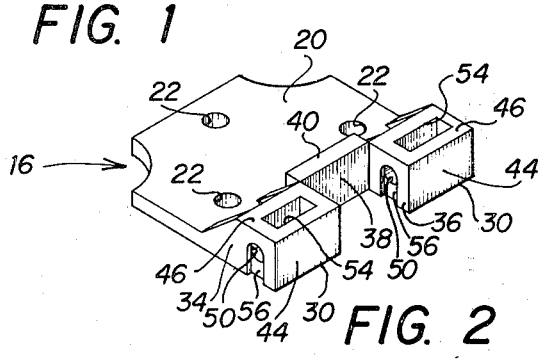
FIG. 2
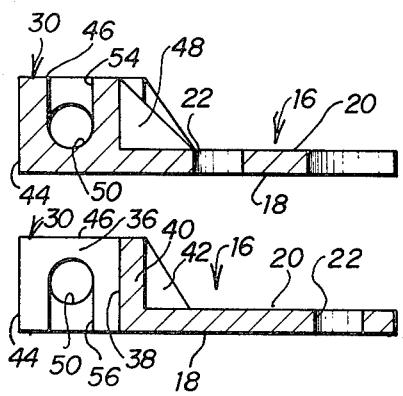
FIG. 4
FIG. 5
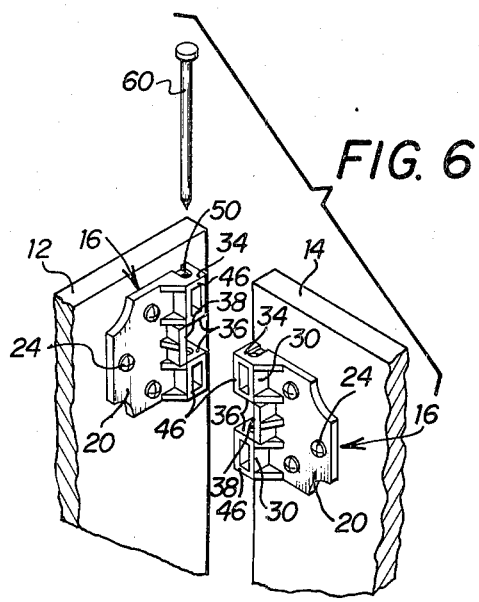
FIG. 6
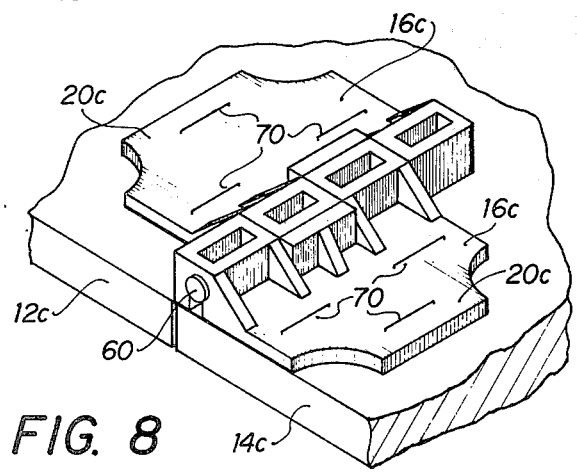
FIG. 8
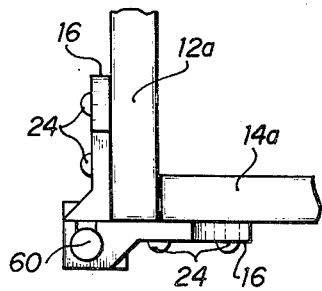
FIG. 7

SELECTIVELY REPOSITIONABLE FASTENER

BACKGROUND OF THE INVENTION

The present invention relates to improvements in fasteners for rigidly connecting structural members. In another aspect, this invention relates to fasteners which can quickly and rigidly connect structural members in a plurality of different orientations.

The furniture industry has for many years beens concerned with shipping costs associated with the transportation of completely fabricated articles. These shipping costs are determined not only by the weight of an article but also by the volume occupied thereby. Thus, these costs could be lowered by reducing the volume of the articles shipped. Furniture such as desks, dressers, and the like, generally comprirse structures which are relatively lightweight, but occupy comparatively large volumes. The components of these articles of furniture are substantially lower in volume. Therefore, if the furniture could be manufactured in a "knock-down" condition, shipped in a "knock-down" configuration, and cheaply assembled at the destination, significant savings in transportation expense could be achieved.

To enable the use of knock-down furniture, it is essential that some means be used to simply and inexpensively connect the components of the furniture. Conventional fasteners, such as braces, nails, pegs, glue, and the like, are not readily adaptable for the use in knock-down furniture. This is because these fasteners are fairly permanent in nature, require some degree of skill to install and are time consuming to use.

To overcome the disadvantage of these conditional fasteners, various fastening devices have been proposed. Although these new devices are quick and easy to assemble and disassemble, they are either not sufficiently strong when assembled to provide the require rigidity necessary in furniture, or lack the versatility of mounting orientation necessary to provide an improved universal fastener.

SUMMARY OF THE INVENTION

Therefore, according to the invention, an improved fastener is provided which is quick and easy to install, strong when assembled, and versatile in use.

The present invention contemplates the use of an improved fastener having a pair of fastener members which are easily connectable by a pin and wherein each of the fastener members has a plurality of locking surfaces which can be selectively positioned to abut a corresponding surface on the other fastener member to lock the fastener members in a plurality of different relative orientations.

The present invention will be readily appreciated by those of ordinary skill in the art as the same becomes better understood by reference to the following detailed description when considered in connection with the accompanying Drawings in which:

BRIEF DESCRIPTION OF THE DRAWINGS

FIG. 1 illustrates a perspective view of the improved fastener of the present invention installed on and connecting a pair of abutting structural members;

FIG. 2 is a perspective view of a fastener member;

FIG. 3 is a plan view of a fastener member;

FIG. 4 is a sectional view taken on line 4—4 of FIG. 3, looking in the direction of the arrows;

FIG. 5 is a sectional view taken on line 5—5 of FIG. 3, looking in the direction of the arrows;

FIG. 6 is an exploded perspective view showing the fastener of the present invention utilized to attach two structural members to form a corner;

FIG. 7 is a plan view of the fastener of the present invention utilized to connect two structural members to form a corner with the fastener positioned on the exterior of the corner; and FIG. 8 is a perspective view illustrating the fastener of the present invention utilized to attach two structural members in a flush arrangement.

DESCRIPTION OF THE PREFERRED EMBODIMENT

Referring now to the Drawings wherein like reference characters designate like or corresponding parts throughout the several views, there is illustrated in the Figures, an improved fastener of the present invention which for purposes of description is identified by reference numeral 10. The fastener 10 of the present invention is illustrated in FIG. 1 used to attach a pair of structural members 12 and 14 to form a right angle corner. In the configuration of FIG. 1, the fastener 10 is shown installed on the inside of the corner. As will be hereinafter demonstrated, the fastener of the present invention is simple and inexpensive to use and install, provides a rigid connection between the structural members 12 and 14 and can be installed in a plurality of orientations in addition to FIG. 1, such as the planar mount, shown in FIG. 8, or the outside corner mount, shown in FIG. 7.

Referring to FIGS. 1–6, it can be seen that the fastener 10 of the present invention comprises two separate fastener members 16 which in the illustrated embodiment are identical in shape. By constructing the fastener members 16 in a common shape and with the universal mounting capabilities of the fastener 10, the necessity of furniture manufacturers inventarying a pluiality of different fasteners is eliminated.

The fastener members 16 have a planar mounting surface 18 on one side thereof or contacting the structural member to which the fastener member 16 is to be attached. This planar surface 18 extends completely across one side of the fastener member 16 so that flush mounting of the fastener member 16 can be accomplished.

A flanged portion 20 is formed on one end of the fastener member and is provided with a plurality of apertures 22 therethrough. These apertures 22 extend completely through the fastener members 16 and are of a size to accommodate means 24 for rigidly attaching the fastener members 16 to a structural member. In FIG. 1, fastener means 24 are illustrated as being Phillips screws. It is to be understood, of course, that other types of fasteners could be used as required by the particular use and the the apertures 22 could be countersunk as desired or changed in shape to accommodate the individual physical requirements of the fasteners selected.

Located on the end of the fastener member 16 opposite the flanged portion 20 is a connecting portion for attaching members 16 together. The connecting portion is formed in a bifurcated shape with two legs 30 forming a rectangular cross section slot 32 therebetween. The width "A" of the legs 30 is slightly less than the width of "B" of the slot 32. It is noted, that in order to assure easy alignment and coupling of members 16, it is preferred that width B of slot 32 be sufficiently wide in relation to width A of legs 30 that a snug or "friction fit will not occur when a leg 30 is inserted within a slot 32. For example, it is preferred that width B of slots 32 be from about 1/16 inch to about 3/32 inch wider than width A of legs 30 when width A is about ½ inch. Each leg 30 has external and internal opposingly facing planar sides 34 and 36, respectively. These sides 34 and 36 extend in a spaced parallel relationship transverse to surface 18. The internal surfaces 36 form two sides of slot 32. A planar primary locking surface 38 defines the inward extent of the slot 32 and interconnects the two internally facing surfaces 36. The surface 38 is particularly important and provides a primary locking surface which will be hereinafter described in detail. Locking surface 38 extends transverse to the planar surfaces 18 and surfaces 36.

The primary locking surface 38 is formed on an upstanding wall 40 which projects from the side of flange 20 opposite the planar surface 18. The upstanding wall 40 is reinforced by a plurality of gussets 42 which extend from the wall 40 in a direction away from the locking surface 38. These gussets, in combination with wall 40, provide rigidity for the primary locking surface 38.

Secondary locking surfaces 44 and 46 are formed on the legs 30 for corresponding engagement with the primary locking surface 38 of another fastener member 16. The locking surfaces 44 are parallel and aligned. Surfaces 44 are positioned on the extremities of the legs 30. The surfaces 44 intersect surfaces 18, 34 and 36 at right angles. The secondary locking surfaces 46 extend in a common plane and are parallel to the surface 18. Surfaces 46 extend transverse to the surfaces 34, 36, 38 and 44. Gussets 48 are provided on the legs 30 to extend in a direction away from the surface 44 to add rigidity to the legs 30.

Each of the legs 30 is provided with a bore 50 which extends completely therethrough. These bores 50 extend through the surfaces 34 and 36 and are transverse thereto. The bores 50 are aligned such that a pin 60 or other suitable locking device can be axially inserted therethrough.

A rectangular opening 54 is formed in each of the surfaces 46 and extends in a direction to intersect with bores 50. These openings 54 allow freedom of movement and manipulation of the locking pin when being inserted through the legs 30. The surfaces 34 and 36 are each slotted at 56 in a direction to extend toward the surface 18.

The advantages of the improved fastener 10 of the present invention can be appreciated by considering the use of the fastener itself. The installation and use of the fastener is best illustrated in FIGS. 1, 6, 7, and 8. In FIG. 6, an interior right angle corner is illustrated in an exploded condition. The fastener means 24 are utilized to attach a fastener member 16 to each of structural members 12 and 14. The fastener members 16 are appropriately positioned at the edge of the structural members 12 and 14 so that upon an abutting engagement, as shown in FIGS. 1 and 6, the fastener members 16 will interlock. The interlocking of the fastener members 16 is such that one of the legs 30 of the first fastener member 16 fits into the slot 32 of the other of the fastener members while one of the legs of the other fastener member will fit into the slot of the first fastener member.

In this position, surfaces 34 and 36 of the legs 30 of the first fastener member will be abutting the surfaces 34 and 36 of the legs of the other fastener member. In addition, as shown in FIGS. 1 and 6, the secondary locking surfaces 46 will abut and engage the primary locking surfaces 38 of the fastener members to prevent relative movement between the two fastener members.

A pin 60 can be inserted through the bores 50 to rigidly interconnect the two fastener members 16. This pin 60 can be an ordinary nail or a pin especially designed for this use. The pin 60 is illustrated in FIG. 1 in its installed position interlocking the two fastener members 16 together, which in turn, interlocks the structure members 12 and 14 together. Pin 60 can be of a size to cause a resilient force retaining the pin within the bores 50.

As can be seen the abutting primary and secondary locking surfaces will prevent relative rotation of the two fastener members 16 while the pin 60 rigidly attaches the members 16 together and prevents relative transitional movement therebetween. The pin allows a quick and simple method of connection without the necessity of specialized tools or skills in the installation thereof. Pin 60 can be simply inventoried, and as previously pointed out, can be an ordinary nail of proper size and length.

In FIG. 7, an exterior corner mounting of the fastener members 16 of the present invention is illustrated. In this configuration, structural members 12a and 14a are interconnected with the fastener member 16 attached to the exterior of the right angle corner. The installation of the fastener members 16 is accomplished as in the interior corner installation by utilizing fasteners 24 to attach the flange portions 20 to the exterior of the structural members 12a and 14a. The fastener members are then positioned with the legs and slots interlocking as previously described, except that the primary locking surfaces 38 engage the surface 18 on the legs 30 to provide the abutting interlocking engagement. Again, it can be seen that the pin 60 can be simply and easily installed, without requiring any specialized equipment or skill.

In FIG. 8, a flush mounting is illustrated. In this Figure, panel members 12c and 14c are interconnected in a parallel end abutting relationship. The fastener members 16c are identical in structure to the fastener members 16, illustrated in FIGS. 1 through 7, except that the apertures 22 are omitted from the flange 20. In this embodiment, staples 70 are used to connect the flange portions 20c to the structure members 12c and 14c. These stamples 70 are selected of a size and shape which is conventionally available to extend through the flanges 20c and engage the structural members 12c and 14c.

In this configuration, legs and slots are interengaged as previously described with the secondary locking surfaces 44 engaging the primary locking surfaces 38 in an abutting relationship to rigidly interconnect the panels 12c and 14c.

It is to be understood, of course, that in all of the embodiments disclosed, the primary and secondary locking surfaces are relatively positioned transverse to each other for provision of the plurality of different right angle joints. It is envisioned that these surfaces could be relatively positioned at 30°, 60°, or any other suitable angle intervals to be used with a plurality of different angular relative orientations of the structural members and the panels to which they are attached.

Thus, it can be seen that the connector of the present invention provides a plurality of locking surfaces which can be interengaged to utilize one fastener configuration in a plurality of different relative orientations.

The fastener members of the present invention can be constructed from any suitable material, such as plastic, which can be easily molded and provides the strength and rigidity necessary for the particular environment of use, e.g., nylon or the like. A preferred such material is a particulate mineral reinforced polyamide sold under the trademark Vydyne R-100 by Monsanto Polymers and Petrochemicals Co., St. Louis, Missouri. It is also envisioned that the fastener members could be fabricated from metallic materials, for example.

It is also to be understood, of course, that the foregoing disclosure relates only to preferred embodiments of the present invention and that numerous alterations can be utilized to practice the present invention without departing from the spirit and scope of the invention as defined in the appended claims.

What is claimed is:

1. A fastener for rigidly connecting a pair of abutting structural members comprising:
   a. a first fastener member having a support flange with a planar mounting surface contacting and attached to one of said structural members, an enlarged connecting portion extending from one end of said member, said connecting portion having two parallel spaced legs defining a slot therebetween, each of said legs having planar opposing sides defining two walls of said slot, said opposing sides extending transverse to said mounting surface, a primary locking surface connecting and extending between said opposing sides, said primary locking surface being transverse to said mounting surface and transverse to said opposing sides, a plurality of secondary locking surfaces formed on each of said legs, one of said locking surfaces being formed on the extremity of each of said legs, said one secondary locking surface extending transverse to said mounting surface and transverse to said opposing surfaces, a second secondary locking surface being formed on each of said legs in a spaced parallel relationship to said mounting surface, said legs having a width corresponding to the width of said slot, first and second aligned bores passing respectively through said legs and extending through said first and second opposing surfaces;
   b. a second fastener member identical in construction to said first fastener member with the support flange of said second fastener member attached to a second structural member, one of the legs of said second fastener member inserted into the slot on said first fastener member while one of the legs of said first fastener member is inserted into the slot of said second fastener member, one of the secondary locking surfaces of said second fastener member abutting the primary locking surface of said first fastener member and one of the secondary locking surfaces of said first fastener member abutting the primary locking surface of said second fastener member, the aligned bores of said first fastener member being aligned with the bores of said second fastener member; and
   c. a locking pin means inserted through said bores on said first and second fastener members thereby holding said first and second members in a fixed immovable relationship.

2. A device for fastening a pair of abutting structural members comprising:
   a. first and second identical fastening members, each said fastening member comprising a base section adapted to be attached to a structural member and at least two leg means extending therefrom and spaced by a slot which is formed from first and second opposed spaced surfaces of adjacent leg means which are joined by a slot base which carries a primary locking surface, said first and second opposed spaced surfaces having aligned first and second apertures, respectively, passing therethrough, said leg means of each of said fastening members being shaped to mate in a slot between leg means of the other fastener member, each of said leg means having a secondary locking surface adapted to rest firmly in a fixed abutting relationship with a primary locking surface of the other said fastener member and having a bore passing therethrough which is positioned to align with said first and second apertures in said first and second opposed spaced surfaces of adjacent leg means of the other said fastening member to thereby form a pin channel through all leg means of said first and second fastener members when a leg means of one said fastener member is mated in a slot of the other said fastener member; and
   b. a locking pin means for extending through said pin channel to thereby hold said first and second fastener members in a fixed immovable relationship.

3. The device of claim 2 further comprising at least two of said secondary locking surfaces carried by each of said leg means of said fastener members.

4. The device of claim 3 wherein each said leg means of said fastener members comprises a first seconday locking surface positioned perpendicular to the base section thereof and a second and third secondary locking surface spaced by said first and second side surfaces and positioned parallel to the base section thereof.

* * * * *